United States Patent [19]

Spinks et al.

[11] Patent Number: 5,202,083
[45] Date of Patent: Apr. 13, 1993

[54] PASSIVE SHUTDOWN COOLING SYSTEM FOR NUCLEAR REACTORS

[75] Inventors: Norman J. Spinks, Deep River; Ronald H. Shill, Saint Lamberts, both of Canada

[73] Assignee: Atomic Energy of Canada Limited, Chalk River, Canada

[21] Appl. No.: 843,219

[22] Filed: Feb. 28, 1992

[51] Int. Cl.$^5$ .............................................. G21C 15/18
[52] U.S. Cl. ..................................................... 376/299
[58] Field of Search ......................................... 376/299

[56] References Cited

U.S. PATENT DOCUMENTS

| | | | |
|---|---|---|---|
| 4,051,892 | 10/1977 | Reinsch | 376/299 |
| 4,187,147 | 2/1980 | Braun et al. | 376/299 |
| 4,312,703 | 1/1982 | Woudstra | 376/299 |
| 4,360,496 | 11/1982 | Marker et al. | 376/298 |
| 4,382,908 | 5/1983 | Petersen | 376/299 |
| 4,486,383 | 4/1984 | Esayan et al. | 376/299 |
| 4,689,194 | 8/1987 | Wachholz et al. | 376/299 |
| 4,699,754 | 10/1987 | French | 376/299 |
| 4,753,771 | 6/1988 | Conway et al. | 376/299 |

OTHER PUBLICATIONS

Kare Hannerz, "Applying Pius to Power Generation: the Secure-P LWR", *Nuclear Engineering International*, 28, 349, Dec. 1983.

A. Natalizio et al. "Passive Safety Features for Next Generation Candu Power Plants", IAEA Workshop, Chicago, Aug. 1989.

S. N. Tower et al. "Passive and Simplified System Features for the Advanced Westinghouse 600 MWe PWR", *Nuclear Engineering and Design*, 109 (1988), pp. 147–154.

*Primary Examiner*—Daniel D. Wasil
*Attorney, Agent, or Firm*—Gowling, Strathy & Henderson

[57] ABSTRACT

A nuclear reactor system including a heat transport path around which a coolant is pumped by main circulation pumps to transport heat from the reactor core to a steam generator. A further decay heat removal path is connected in parallel with the steam generator and main pumps and has a heat exchange component located at an elevation such that a natural convection flow will occur in the decay heat removal path when the main pumps are shutdown. Means are provided to mainain a small flow in the decay heat removal path during normal operation of the main pump. That small flow is in the intended direction of the natural convection circulation flow and maintains a temperature difference within the decay heat removal path that provides a buoyancy force to immediately start a natural circulation flow if the main pumps are shutdown. The main pumps are to be shutdown, as is the reactor, on loss of the steam generator as a heat sink. Then the natural convection flow in the decay heat removal path ensures that the heat exchange component is immediately available as an alternate heat sink. The small flow, during operation, can be provided by an additional pump in the decay heat removal path or by bleeding a small flow from an appropriate position in this path.

20 Claims, 2 Drawing Sheets

PASSIVE SHUTDOWN COOLING SYSTEM FOR NUCLEAR REACTORS

FIELD OF THE INVENTION

The invention relates to a nuclear reactor with a primary cooling circuit for removing heat generated in the reactor core during normal operation and an additional means for dissipating decay heat, which is produced in the core of the nuclear reactor after the reactor has been shutdown, without short term reliance on electrical supplies, service water and operator action.

BACKGROUND OF THE INVENTION

An emergency or normal shutdown of any high-temperature nuclear reactor creates a need for a system to remove excessive decay heat. Nuclear reactors produce, during the course of their normal operation, radioactive materials which decay and produce heat for a period of time after the reactor is shutdown. Sufficient coolant must continue to circulate for a lengthy period of time to remove that heat to prevent damage to the reactor and associated systems. A power generating nuclear reactor, for instance, is generally provided with a steam generator which acts as a heat sink during normal operation. Therefore, a means must be present to provide an alternate heat sink when the steam generator is not available.

U.S. Pat. No. 4,699,754 describes one system for removing decay heat from a reactor core which has a liquid metal coolant circulation system. Typical coolants for these type of reactors are sodium or potassium which, during operation, may reach temperatures in the order of 1200° to 1500° K. Previous reactors of this type have used an auxiliary Thermoelectric Electromagnetic Pump in an auxiliary flow path connected in parallel to a portion of the primary flow path. These previous reactors had a check valve in the primary flow path between the connections for the auxiliary path. During normal operation, a primary cooling pump flow holds that check valve open. However, the auxiliary Thermoelectric Electromagnetic Pump maintains a coolant flow through the auxiliary flow path with the check valve preventing back-flow if the primary cooling pump stops. U.S. Pat. No. 4,699,754 mentions that moving parts such as check valves are unreliable when subjected to high-temperatures and held in one position for long periods. In order to avoid the necessity for this check valve, U.S. Pat. No. 4,699,754 suggests using the Thermoelectric Electromagnetic Pump in the auxiliary flow path to re-inject a secondary stream of metal coolant into the main coolant stream. The re-injection acts as a drive fluid for a jet pump in the main flow path which, using the principal of momentum exchange, induces a circulation of the main fluid in the same direction as the normal primary coolant flow. This provides an auxiliary circulation system without any moving parts and which is self-regulating. The auxiliary Thermoelectric Electromagnetic Pump/jet pump combination operates during normal operation of the reactor but the flow in the auxiliary flow path is small compared to the main flow so that the systems efficiency is not greatly diminished.

U.S. Pat. No. 4,689,194 shows another type of decay heat removal system which, in this case, is for a gas cooled reactor. Circulating blowers cause a cooling gas, such as helium, in this reactor to flow up through the reactor core and a central hot gas line down over principal heat exchangers, these may be steam generators, and decay heat exchangers back to the blowers. If the circulating blowers are not operational, decay heat from the core is removed by natural convection flow of the cooling gas in the same direction as the flow during normal operation of the reactor. The decay heat exchangers are each connected with an external re-cooling heat exchanger at a geodetically high location by means of two legs which form a water circulation loop. If the steam generators are no longer available for the removal of heat from the primary (helium) cooling path, they are traversed by hot gas which subsequently passes through the decay heat exchangers. This causes a rise in temperature at the inlet of the decay heat exchangers which leads to evaporation taking place in the water circulation loops whereby natural convection in these loops is enhanced and a sufficient amount of heat is removed from the primary loop through the decay heat exchangers.

U.S. Pat. No. 4,312,703 describes another type of system for removing heat from a nuclear reactor employing liquid sodium as a primary cooling fluid along with means for dissipating the decay heat produced in the core of the nuclear reactor after it has been switched off. In this system, a pump draws the liquid sodium coolant from the reactor vessel and transports it to an integrated intermediate heat exchanger and decay heat cooler before the coolant is returned to the reactor vessel. A secondary coolant fluid, also liquid sodium, in the intermediate heat exchanger receives heat from the primary cooling fluid with the secondary cooling fluid being pumped to a steam generator and back to the intermediate heat exchanger during normal operation of the reactor. A separate or third cooling circuit is integrated into the intermediate heat exchanger and forms a decay heat cooler in which a third cooling fluid can flow to a cooler component (air cooler or steam generator), then to a pump which circulates the third cooling fluid back to the intermediate heat exchanger to remove decay heat generated when the reactor is shut down. This structure provides a very compact construction compared to previous systems wherein a decay heat cooler is incorporated as a separate heat exchanger in the primary circuit.

SUMMARY OF THE INVENTION

It is an object of the invention to provide an improved passive shutdown cooling system for a nuclear reactor without short term reliance on electrical supplies, service water and operator action by utilizing natural convection circulation of coolant.

A nuclear reactor system, according to one preferred embodiment of the present invention, is provided with a main heat transport path containing a first heat removal component, a main coolant pump and coolant in the heat transport path; the coolant being pumped in the heat transport path by the main coolant pump through a core of the reactor to said heat removal component and back to the reactor core to transport heat generated in the reactor core to the heat removal component during normal operation of the reactor system; wherein a further decay heat removal path is connected in parallel with the heat removal component and main coolant pump, the further decay heat removal path including a heat exchange component located at an elevation such that a natural convection flow will occur in the decay heat removal path from a high temperature outlet for coolant from the reactor core to a low temperature inlet to the reactor core when said main coolant pump is shutdown; the further decay heat removal path includes a means to prevent flow in a direction opposite to the intended natural convection flow and a means to maintain a small flow of coolant from said outlet through the heat exchange component during normal operation of the main coolant pump.

BRIEF DESCRIPTION OF THE DRAWINGS

The present invention will now be described in more detail with reference to the accompanying drawings, wherein.

DESCRIPTION OF THE PREFERRED EMBODIMENTS

Figure 1:
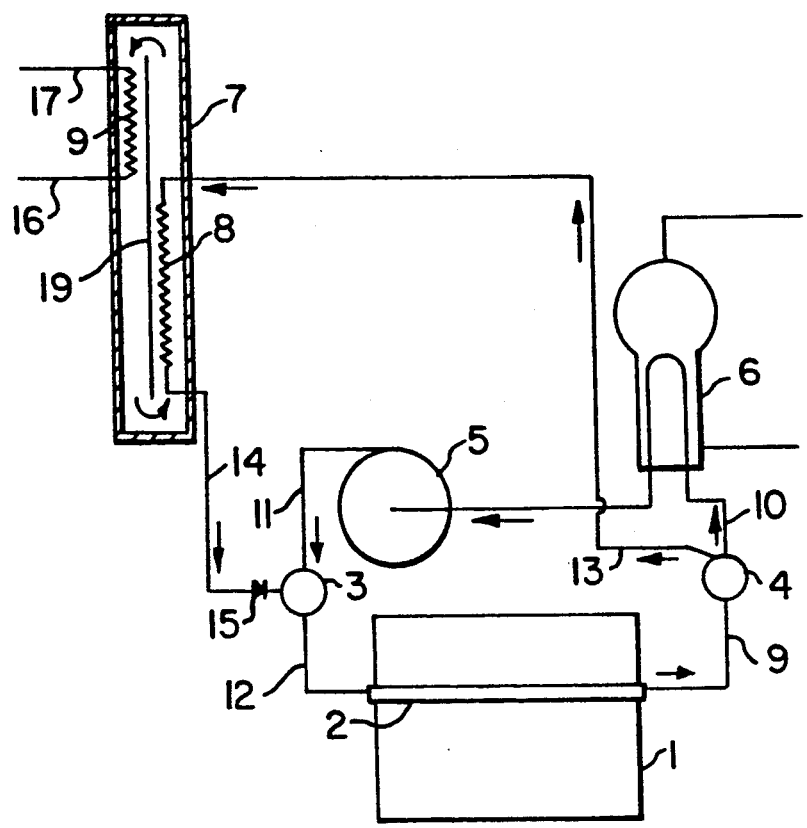
FIG. 1 diagrammatically shows a proposed passive shutdown cooling path for a CANDU nuclear reactor.

The core 1 of a CANDU nuclear reactor has a number of fuel channels 2 extending through it with cooling water flowing from an inlet header 3 via pipe 12 through the channel 2 and via pipe 9 to outlet header 4. The normal flow of cooling water during operation of the reactor is from high temperature header 4 via pipe 10 through a steam generator 6 to main circulation pumps 5 which return the cooling water to low temperature header 3 and back to the reactor core. To prevent overheating of the reactor core when the steam generator cooling is lost due to an accident, a decay heat removal path is also connected between outlet header 4 and inlet header 3 to remove decay heat from the reactor core.

Such decay heat removal paths are normally provided with a pump to circulate the coolant to a heat exchanger. However, pumps rely on electrical supplies. Instead the heat exchanger could be located, as in FIG. 1, at an elevation such that a natural convection flow will develop, precluding any reliance on electrical supplies.

The decay heat cooling path consists of pipe 13 extending from high temperature header 4 to an inlet of a heat exchanger 8 in a large tank 7 of water which forms a heat sink. The outlet of heat exchanger 8 is connected to pipe 14 and through check valve 15 to low-temperature inlet header 3. The check valve 15 opposes the main pump head and prevents backflow through pipe 14, heat exchanger 8 and pipe 13 when the main pumps 5 are operating. The heat exchanger 8 is located at a higher level than the reactor headers 3 and 4 so that a natural convection flow can occur from header 4 to 3 when pump 5 is tripped. A further heat exchange coil 9 which is connected to service water by lines 16 and 17 can be provided on the other side of a partial divider 19 in tank 7 to remove heat from the water. However, the large tank 7 of water provides a heat sink for several days should service water, via pipes 16 and 17, be unavailable.

In this type of system, when steam generator cooling is lost, the main pumps 5 would be tripped, and coolant from high temperature header 4 can start a natural convection circulation flow up pipe 13 down through heat exchanger 8 and via pipe 14 through check valve 15 to low temperature header 3. This natural circulation flow through the decay heat cooling path is of a sufficient size to remove decay heat from the shutdown reactor. However, in a CANDU reactor, the header to header pressure drop is close to zero and can even be in the wrong direction which creates problems in getting the natural circulation flow started in the decay heat cooling path.

Figure 2:
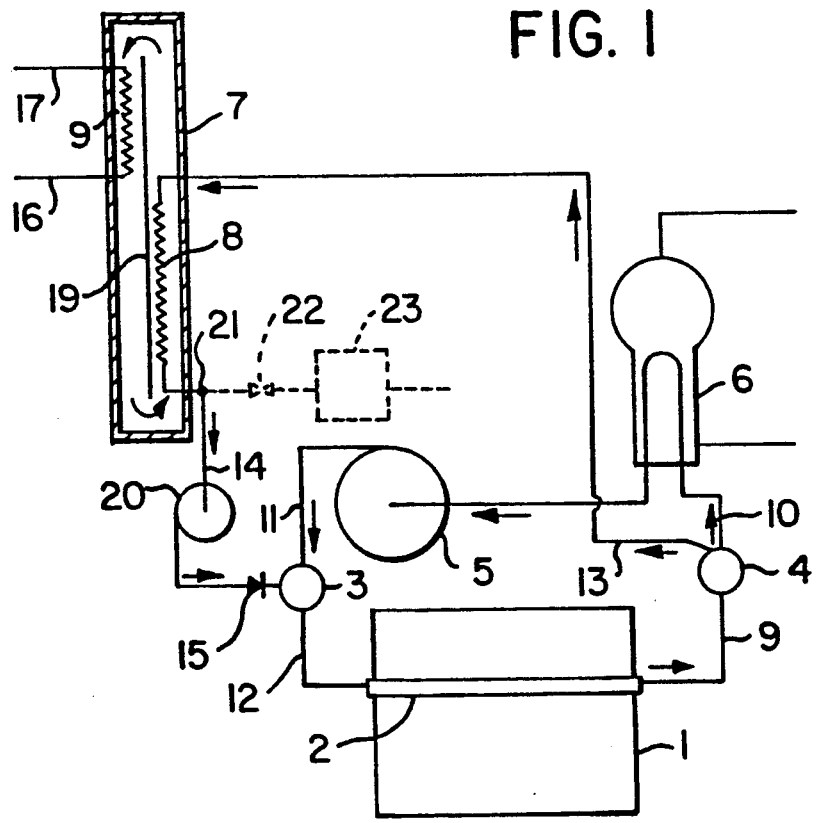
FIG. 2 shows an improved passive shutdown cooling path according to the present invention.
Figure 3:
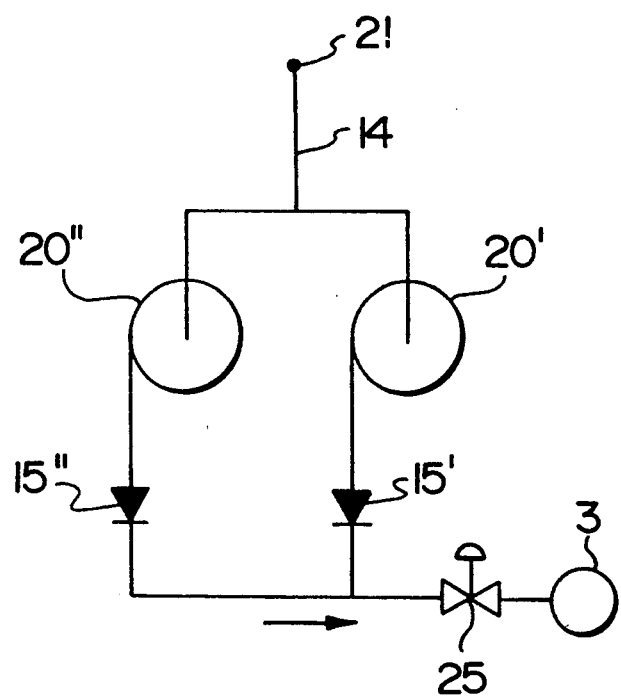
FIG. 3 shows a cooling path pump configuration according to the present invention.

FIG. 2 shows an alternative system, according to the present invention, for inducing a natural circulation flow in the decay heat cooling path. The system contains the same elements as shown in FIG. 2 with the addition of a pump 20 in the coolant flow pipe 14 before the check valve 15. This pump 20 is normally running, along with main pumps 5, to provide a small flow through the decay heat cooling path. That small flow, from the high temperature header 4, is in the intended direction of the natural convection circulation flow and maintains a temperature difference within the decay heat removal path that provides a buoyancy force to immediately start a natural circulation flow in the decay heat cooling path if all the pumps 5 and 20 are shutdown. The inclusion of pump 20 in the circuit provides the additional advantage of a controllable flow in the shutdown cooling circuit when the steam generator is out of service for repairs. The decay heat cooling path pump 20 will need to have a head which matches that of the main pumps 5. The flow in the decay heat cooling path, during normal operation of the reactor, needs to be controlled so that it is as small as possible and at the same time maintains sufficient buoyancy force to start a natural circulation flow. This will avoid wasting thermal power from the reactor. As shown in FIG. 3 control valve 25 may be used to control the small flow in the decay heat cooling path but speed control of pump 20 is preferred since a flow control valve may stick.

For greater reliability, it may be desirable as also shown in FIG. 3 to provide two decay heat cooling path pumps in parallel 20' and 20" each having its own check valve 15' and 15", respectively. If only a single pump 20 as in FIG. 2 were located in the decay heat cooling path and that pump stops, then the buoyancy force necessary to start a natural circulation flow would disappear as the hot leg of the decay heat cooling path cools down. The loss of a single decay heat cooling path pump may, as a result, necessitate tripping the reactor and main pumps before the hot leg cools down in order to ensure that a natural circulation flow is started in the decay heat cooling path. With two pumps 20' and 20" in parallel, the other pump can continue to maintain the low flow in the decay heat cooling path when one of them fails. A decay heat cooling path pump may be lost due to, for instance, shaft failure or a bearing seizure. Another reason for using two pumps in parallel is the resistance to a natural circulation flow that would be created by a seized pump if only one is used in the decay heat cooling path.

An alternative means, to pump 20, of providing a small flow in the decay heat cooling path is to continuously bleed the flow from a location 21 through a valve 22 as shown in dotted lines in FIG. 2. Location 21 is positioned after the outlet from heat exchanger 8 and before check valve 15. This could then serve the dual purpose of supplying coolant for purification to purification unit 23 in which case the heat exchanger 8 would serve as a purification cooler. The flow could be returned to the heat transport system upstream of pump 5 to minimize the required pump head.

Various modifications may be made to the preferred embodiments without departing from the spirit and scope of the invention as defined in the appended claims. For instance, although the preferred embodiments have been described with respect to a CANDU reactor, similar systems may be used in other types of nuclear reactors wherein a pump, or other means, would be operating during normal operation of the reactor to move a small flow from the primary cooling path through a decay heat cooling path and return that small flow to the primary cooling path, so as to permit a natural convection flow to be rapidly established, when required, in the decay heat cooling path.

The embodiments of the invention in which an exclusive property or privilege is claimed are defined as follows:

1. A nuclear reactor system comprising a reactor core and a main heat transport path containing a first heat removal component, at least one main coolant pump and coolant wherein, during normal operation, the coolant is pumped in the main heat transport path by said main coolant pump through a core of the reactor to said heat removal component and back to the reactor core to transport heat generated in the reactor core to the heat removal component; the system comprising a further decay heat removal path connected in parallel with the heat removal component and main coolant pump, the further decay heat removal path including a heat exchange component located at an elevation such that a natural convection flow will occur in the decay heat removal path from a high temperature outlet for coolant from the reactor core through the heat exchange component and to a low temperature inlet of the reactor core when said main coolant pump is shutdown; the further decay heat removal path includes a means to prevent flow in a direction opposite to the intended natural convection flow and a means to maintain a small flow of coolant from said outlet and through the heat exchange component during normal operation of the main coolant pump.

2. A nuclear reactor system as defined in claim 1, wherein the means to maintain the small flow of coolant is a first high-head low-flow pump and the means to prevent flow in the opposite direction is a check valve in the decay heat removal path.

3. A nuclear reactor system as defined in claim 2, wherein the first heat removal component is a steam generator.

4. A nuclear reactor system as defined in claim 2 wherein a second high-head low-flow pump is connected in parallel to said first high-head low-flow pump.

5. A nuclear reactor system as defined in claim 4, wherein a control valve is located in the decay heat removal path to control said small flow to a suitable value.

6. A nuclear reactor system as defined in claim 4, wherein a speed control for the high-head low-flow pumps provides a control to maintain said small flow at a suitable value.

7. A nuclear reactor system as defined in claim 1, wherein the means to prevent flow in the opposite direction is a check valve in the decay heat removal path and the means to maintain said small flow is a bleed located between an outlet of the heat exchange component and the check valve.

8. A nuclear reactor system as defined in claim 1, wherein the heat exchange component is a heat exchanger located in a large tank of coolant.

9. A nuclear reactor system as defined in claim 7, wherein the heat exchange component is a heat exchanger located in a large tank of coolant.

10. A nuclear reactor system as defined in claim 7, wherein the heat removal component is a steam generator.

11. A nuclear reactor system as defined in claim 10, wherein the bleed from the decay heat removal path is connected to a purification unit.

12. A nuclear reactor system as defined in claim 1, wherein the first heat removal component is connected to a high temperature outlet header of the reactor and said at least one main coolant pump is connected to a low temperature inlet header of the reactor.

13. A nuclear reactor system as defined in claim 12, wherein the heat removal component is a steam generator.

14. A nuclear reactor system as defined in claim 13, wherein the means to maintain the small flow of coolant is a first high-head low-flow pump and the means to prevent flow in the opposite direction is a check valve in the decay heat removal path.

15. A nuclear reactor system as defined in claim 14, wherein a further high-head low-flow pump is connected in parallel to said first high-head low-flow pump.

16. A nuclear reactor system as defined in claim 15, wherein a speed control for the high-head low-flow pumps provides a control to maintain said small flow at a suitable valve.

17. A nuclear reactor system as defined in claim 16, wherein the heat exchange component is a heat exchanger located in a large tank of water.

18. A nuclear reactor system comprising a reactor core through which a coolant flows from a low temperature inlet header to a high temperature outlet header with a primary cooling circulation path being located between the high temperature outlet header and the low temperature inlet header including main circulation pumps and a heat removal component, wherein a decay heat removal path is connected between the high temperature outlet header and low temperature inlet header and includes a heat exchange component located at an elevation such that a natural convection circulation flow can start in the decay heat cooling path from the high temperature outlet header to the low temperature inlet header when the main circulation pumps are shutdown, a high-head low-flow pump being located in the decay heat cooling path for maintaining a small flow of coolant in the decay heat cooling path in the same direction as the natural convection circulation flow during normal operation of the main circulation pumps.

19. A nuclear reactor system as defined in claim 18 wherein a check valve in the decay heat removal path prevents flow in a direction opposite to the intended natural convection circulation flow.

20. A nuclear reactor system comprising a reactor core through which a coolant flows from a low temperature inlet header to a high temperature outlet header with a primary cooling circulation path being located between the high temperature outlet header and the low temperature inlet header including main circulation pumps and a heat removal component, wherein a decay heat removal path is connected between the high temperature outlet header and low temperature inlet header and includes a heat exchange component located at an elevation such that a natural convection circulation flow can start in the decay heat cooling path from the high temperature outlet header to the low temperature inlet header when the main circulation pumps are shutdown, a coolant bleed line being located in the decay heat cooling path for maintaining a small flow of coolant in the decay heat cooling path in the same direction as the natural convection circulation flow during normal operation of the main circulation pumps.

* * * * *